(12) United States Patent
Harper

(10) Patent No.: US 7,686,991 B2
(45) Date of Patent: Mar. 30, 2010

(54) METHOD OF ALIGNING A DIE AND STAMPING A SUBSTRATE FOR NANO-IMPRINT LITHOGRAPHY

(75) Inventor: Bruce M. Harper, San Jose, CA (US)

(73) Assignee: WD Media, Inc., San Jose, CA (US)

(*) Notice: Subject to any disclaimer, the term of this patent is extended or adjusted under 35 U.S.C. 154(b) by 269 days.

(21) Appl. No.: 11/788,062

(22) Filed: Apr. 18, 2007

(65) Prior Publication Data

US 2007/0194473 A1 Aug. 23, 2007

Related U.S. Application Data

(62) Division of application No. 10/807,702, filed on Mar. 23, 2004, now Pat. No. 7,229,266.

(51) Int. Cl.
  *B29C 43/02* (2006.01)
  *B29C 45/02* (2006.01)
  *B29C 45/66* (2006.01)
  *B29C 45/76* (2006.01)

(52) U.S. Cl. ............... 264/40.5; 264/40.1; 264/293; 264/106; 264/107; 425/150; 425/193; 425/400; 425/406; 425/451.6; 425/385; 425/810

(58) Field of Classification Search ............ 264/106, 264/107, 40.5, 293; 425/150, 810, 451.6, 425/405.1, 193
See application file for complete search history.

(56) References Cited

U.S. PATENT DOCUMENTS

| | | | |
|---|---|---|---|
| 3,526,690 A * | 9/1970 | Bachman | 264/107 |
| 3,883,287 A * | 5/1975 | Grawey et al. | 425/405.1 |
| 4,001,645 A | 1/1977 | Haas et al. | |
| 4,038,009 A * | 7/1977 | Toull | 425/308 |
| 4,062,600 A | 12/1977 | Wyse | |
| 4,134,716 A | 1/1979 | John, Jr. | |
| 4,279,607 A | 7/1981 | Taylor | |
| 4,296,301 A | 10/1981 | Johnson | |
| 4,535,617 A | 8/1985 | Ochsner | |
| 4,544,820 A | 10/1985 | Johnson | |
| 4,694,703 A | 9/1987 | Routson | |
| 4,970,925 A | 11/1990 | Nakatsuji | |
| 5,022,619 A | 6/1991 | Mamada | |
| 5,032,078 A | 7/1991 | Benenati | |

(Continued)

FOREIGN PATENT DOCUMENTS

JP 2001-308035 * 11/2001

OTHER PUBLICATIONS

Steinel Catalog, 2003 Edition, pp. 1.01, 1.12 and cover pages.

*Primary Examiner*—Joseph S Del Sole
*Assistant Examiner*—Nahida Sultana
(74) *Attorney, Agent, or Firm*—Blakely, Sokoloff, Taylor & Zafman LLP

(57) ABSTRACT

A method of aligning die and stamping substrate for nano-imprint lithography is described. The method includes aligning the die by linearly displacing the die along a first axis using a first flexure member and pressing the die along a second axis substantially perpendicular to the first axis while maintaining coupling of the die with the first flexure member.

22 Claims, 9 Drawing Sheets

U.S. PATENT DOCUMENTS

| | | |
|---|---|---|
| 5,227,179 A | 7/1993 | Benenati |
| 5,263,237 A | 11/1993 | Gallant et al. |
| 5,269,163 A | 12/1993 | Yagi et al. |
| 5,413,018 A | 5/1995 | Wada et al. |
| 5,427,599 A | 6/1995 | Greschner et al. |
| 5,493,959 A | 2/1996 | Yagi et al. |
| 5,645,776 A * | 7/1997 | Lian .......................... 264/40.5 |
| 5,648,105 A * | 7/1997 | Shimazu et al. ............. 425/139 |
| 5,666,870 A | 9/1997 | Enomoto et al. |
| 5,836,080 A | 11/1998 | Inagaki |
| 6,264,459 B1 * | 7/2001 | Voets ......................... 425/548 |
| 6,510,720 B1 | 1/2003 | Newman et al. |
| 6,696,220 B2 | 2/2004 | Bailey et al. |
| 7,070,405 B2 * | 7/2006 | Sreenivasan et al. ..... 425/174.4 |
| 2002/0098426 A1 | 7/2002 | Sreenivasan et al. |
| 2003/0113400 A1* | 6/2003 | Lai et al. .................... 425/593 |
| 2004/0156947 A1* | 8/2004 | Hada et al. .................. 425/810 |

* cited by examiner

METHOD OF ALIGNING A DIE AND STAMPING A SUBSTRATE FOR NANO-IMPRINT LITHOGRAPHY

REFERENCE TO RELATED APPLICATION

This application is a divisional of Ser. No. 10/807,702 filed Mar. 23, 2004 now U.S. Pat. No. 7,229,266.

TECHNICAL FIELD

Embodiments of this invention relate to the field of manufacturing and, more specifically, to a die press used in manufacturing.

BACKGROUND

A disk drive system includes one or more magnetic recording disks and control mechanisms for storing data within approximately circular tracks on the disk. A disk is composed of a substrate and one or more layers deposited on the substrate (e.g., aluminum). A trend in the design of disk drive systems is to increase the recording density of the magnetic recording disk used in the system. One method for increasing recording density is to pattern the surface of the disk with discrete tracks, referred to as discrete track recording (DTR). A DTR pattern may be formed by nano-imprint lithography (NIL) techniques, in which a pre-embossed forming tool (a.k.a., stamper, embosser, etc.), having an inverse pattern to be imprinted, is pressed into an embossable film (i.e., polymer) disposed above a disk substrate to form an initial pattern of compressed areas. This initial pattern ultimately forms a pattern of raised and recessed areas. After stamping the embossable film, an etching process may be used to transfer the pattern through the embossable film by removing the residual film in the compressed areas. After the imprint lithography process, another etching process may be used to form the pattern in a layer (e.g., substrate, nickel-phosphorous, soft magnetic layer, etc.) residing underneath the embossable film.

One prior DTR structure contains a pattern of concentric raised areas and recessed areas under a magnetic recording layer. The raised areas (also known as hills, lands, elevations, etc.) are used for storing data and the recessed areas (also known as troughs, valleys, grooves, etc.) provide inter-track isolation to reduce noise. The raised areas may have a width less than the width of the recording head such that portions of the head extend over the recessed areas during operation. The recessed areas have a depth relative to fly height of a recording head and raised areas. The recessed areas are sufficiently distanced from the head to inhibit storage of data by the head in the magnetic layer directly below the recessed areas. The raised areas are sufficiently close to the head to enable the writing of data in the magnetic layer directly on the raised areas. Therefore, when data are written to the recoding medium, the raised areas correspond to the data tracks. The recessed areas isolate the raised areas (e.g., the data tracks) from one another, resulting in data tracks that are defined both physically and magnetically.

A press may be used to imprint embossable films residing on one or both sides of a disk substrate. The press utilizes a die for each side of the disk to be imprinted. The die is coupled to a stamper that is pressed into the film to form the imprinted pattern in the film. A DTR disk may not be viable if the imprinting surface of the stamper is not concentrically aligned with the center of a disk substrate. This requirement may be particularly important when data tracks are generated on both sides of the disk because the data tracks on each side need to be in co-axial alignment with each other. As such, the imprinting of an embossable film above a disk substrate requires an alignment step, in which a centerline of the disk is aligned with a centerline of the imprinting surface, before the embossable film is actually imprinted.

Conventional presses utilize 2 and 4 post precision die sets to attain alignment of the top and bottom dies used to imprint films on each side of a disk. A 4-post die set is illustrated in FIG. 1. One problem with such post die sets is that the posts contain bushings or ball bearing sleeves (guides) that wear out or seals that leak lubricant over repeated use. Another problem with such die sets is that the multiple posts hinder access to the die space. Furthermore, current specialized press alignment methods typically require the use of an air bearing supported die that is adjusted to correct for alignment offset. In addition, such presses must be stopped, the die must then be unclamped, supporting air pressure applied, positional adjustments made, supporting air pressure removed, and the die be re-clamped in order to secure the alignment. As a result, the use of such presses results in high maintenance costs due to frequent mechanical wear and breakdown of components, inconsistent accuracy and reliability, and slower manufacturing cycle times.

BRIEF DESCRIPTION OF THE DRAWINGS

The present invention is illustrated by way of example, and not limitation, in the figures of the accompanying drawings in which.

DETAILED DESCRIPTION

In the following description, numerous specific details are set forth such as examples of specific materials or components in order to provide a thorough understanding of the present invention. It will be apparent, however, to one skilled in the art that these specific details need not be employed to practice the invention. In other instances, well known components or methods have not been described in detail in order to avoid unnecessarily obscuring the present invention.

The terms "above," "below," and "between" as used herein refer to a relative position of one layer or component with respect to other layers or components. As such, a first layer or component disposed above or below another layer or component may be directly in contact with the first layer or component or may have one or more intervening layers or components.

It should be noted that the apparatus and methods discussed herein may be used for pressing various types of workpieces. In one embodiment, the apparatus and methods discussed herein may be used for the imprinting of embossable films for the production of magnetic recording disks. The magnetic recording disk may be, for example, a DTR longitudinal magnetic recording disk having, for example, a nickel-phosphorous (NiP) plated substrate as a base structure. Alternatively, the magnetic recording disk may be a DTR perpendicular magnetic recording disk having a soft magnetic film disposed above a substrate for the base structure. In an alternative embodiment, the apparatus and methods discussed herein may be used for the imprinting of embossable materials for the production of other types of digital recording disks, for examples, optical recording disks such as a compact disc (CD) and a digital-versatile-disk (DVD). In yet other embodiments, the apparatus and methods discussed herein may be used in other applications, for examples, the production of semiconductor wafers, display panels (e.g., liquid crystal display panels), etc.

By way of example only, embodiments of a press may be described with respect to imprinting of a film above a disk substrate. However, it will be appreciated by one of skill in the art that embodiments of an imprinting system may be easily adapted for substrates that vary in shape and size (e.g., square, rectangular), for the production of different types of substrates discussed above. Embodiments of an imprinting system described herein may be used for imprinting embossable films with nano-imprint lithography techniques. Alternatively, other scale imprint lithography techniques may be used, such as micro-imprint lithography.

Figure 1:
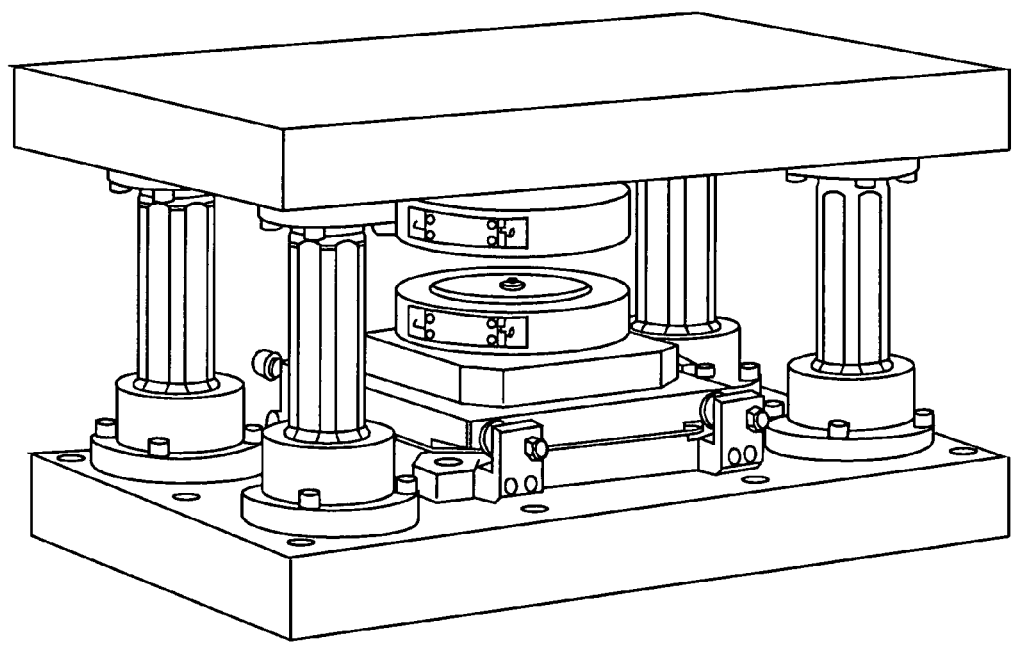
FIG. 1 illustrates a conventional 4-post die set.
Figure 2:
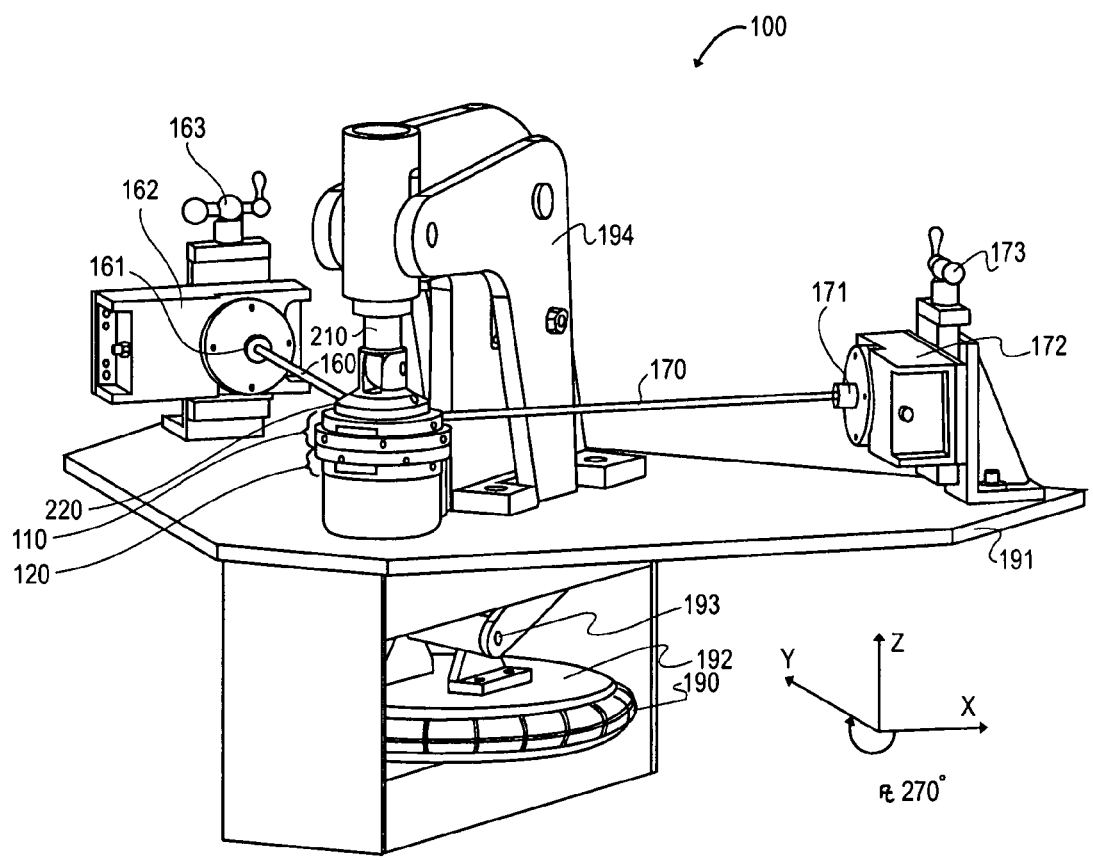
FIG. 2 is a frontal perspective view illustrating one embodiment of a press.

FIG. 2 is a front perspective view illustrating one embodiment a press system. Press 100 may include upper die 110, lower die 120, a thrust mechanism and an alignment mechanism. In one embodiment, the alignment mechanism may include two flexure rods 160 and 170 and corresponding driving mechanisms to adjust the position (position adjustment mechanisms) of upper die 110 to, for example, to align the upper die 110 with lower die 120 as discussed below in relation to FIG. 4. Rods 160 and 170 are made of a material and have dimensions (e.g., diameter and length) that allow for the rods to flex when upper die is raised from the illustrated closed position to an open position, as discussed below in relation to FIGS. 5 and 6. In one embodiment, rods 160 and 170 may have lengths in approximately the range of 20-36 inches and diameters in approximately the range of 0.25 to 0.75 inches. Such dimensions are only exemplary and rods 160 and 170 may have other dimensions.

In one embodiment, press 100 may include hand cranks 163 and 173 may be used to adjust the Z axis position of rods 160 and 170 for planar alignment of the non-flexed rods when press 100 is in the closed position. Alternatively, other mechanisms may be used to for planar alignment of the rods, for example, motors.

In the illustrated embodiment of FIG. 2, rods 160 and 170 are coupled to upper die 110 at locations that are approximately 90 degrees to each other (e.g., corresponding to a X & Y axis). The rod 160, 170 are fixed in the upper die 110 at a first end of the rods. The rod ends may be permanently coupled (e.g., welded) or detachably coupled (e.g., screwed, bolted, etc.) to the upper die at their first ends. Dies 110 and 120 have each been illustrated in the figures with a particular embodiment of press 100 in which the dies have a stepped form. Alternatively, dies 110 and 120 need not have a stepped form.

Figure 3:
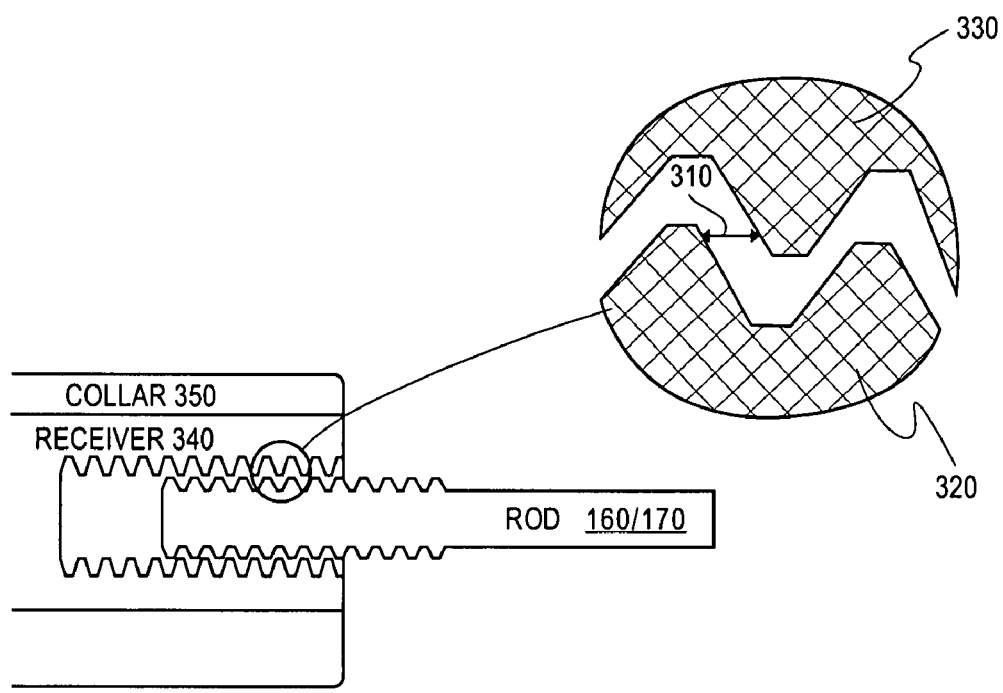
FIG. 3 is a cross section view illustrating one embodiment of rod and receiver.

The other ends of rods 160 and 170 are coupled to the position adjustment mechanisms. In one particular embodiment, rods 160 and 170 are coupled to spindles 161 and 171, respectively, by threaded engagement. These ends of the rods may be threaded with a fine pitch thread 320 and reside inside a corresponding fine-pitch female thread 330 receiver 340, as illustrated in FIG. 3. The female threaded receiver 340 is affixed to a rotatable spindle (e.g., rotatable spindles 161 and 171). The rotations of spindles 161 and 171 are controlled by corresponding motors 162 and 172, respectively. Alternatively, a common motor may be coupled to both of spindles 161 and 171. Motors 161 and 171 may be, for example, servo or stepper motors. Alternatively, other types of motors known in the art may be used. In this manner, rods 160 and 170 may be moved linearly along the Y axis and X axis, respectively, to align upper die 110 with a desired reference, as discussed below.

In one embodiment, motors 162 and 172 may drive spindles 161 and 171, respectively, via a worm reduction gear. In this embodiment, through this compound motion control means, a very fine degree of rod (and thereby upper die 110) motion may be attained. For example, using an 80 pitch thread, a 90:1 worm reduction and a 200 step stepper motor, the total linear displacement of e.g., one step of a stepper motor for one of the rods 160, 170 is approximately 0.0000007" or 0.00000176 mm. Alternatively, other pitch threads, worm reduction ratios, and motor steps may be used. It should be noted that system backlash may be far greater than such a displacement. Backlash 310 is the clearance between the male threads 320 of a rod (e.g., rod 160) and the female threads 330 of a receiver 340, as illustrated in FIG. 3. However, using a closed-loop control system, the servo control will drive the upper die 110 until all backlash 310 is removed and the upper die 110 translates the required amount of position correction for proper alignment. In one embodiment, a clamp 350 (as illustrated in FIG. 3) may be used to secure the receiver 340 in order to reduce or eliminate backlash 310 in the system.

In alternative embodiments, other mechanisms may be used to engage and move rods 160 and 170. In one embodiment, for example, a rack and pinion assembly may be used with a rack disposed on the rod that engages a pinion driven by a motor. In another embodiment, the rods may have a pin that engages a CAM surface on a track. In yet another embodiment, for another example, a rod may be coupled to a hydraulic cylinder that drives the rod. Alternatively, the positioning rods may be directly driven by linear servomotors, which have no intervening gears or threads and resultant backlash.

Figure 4:
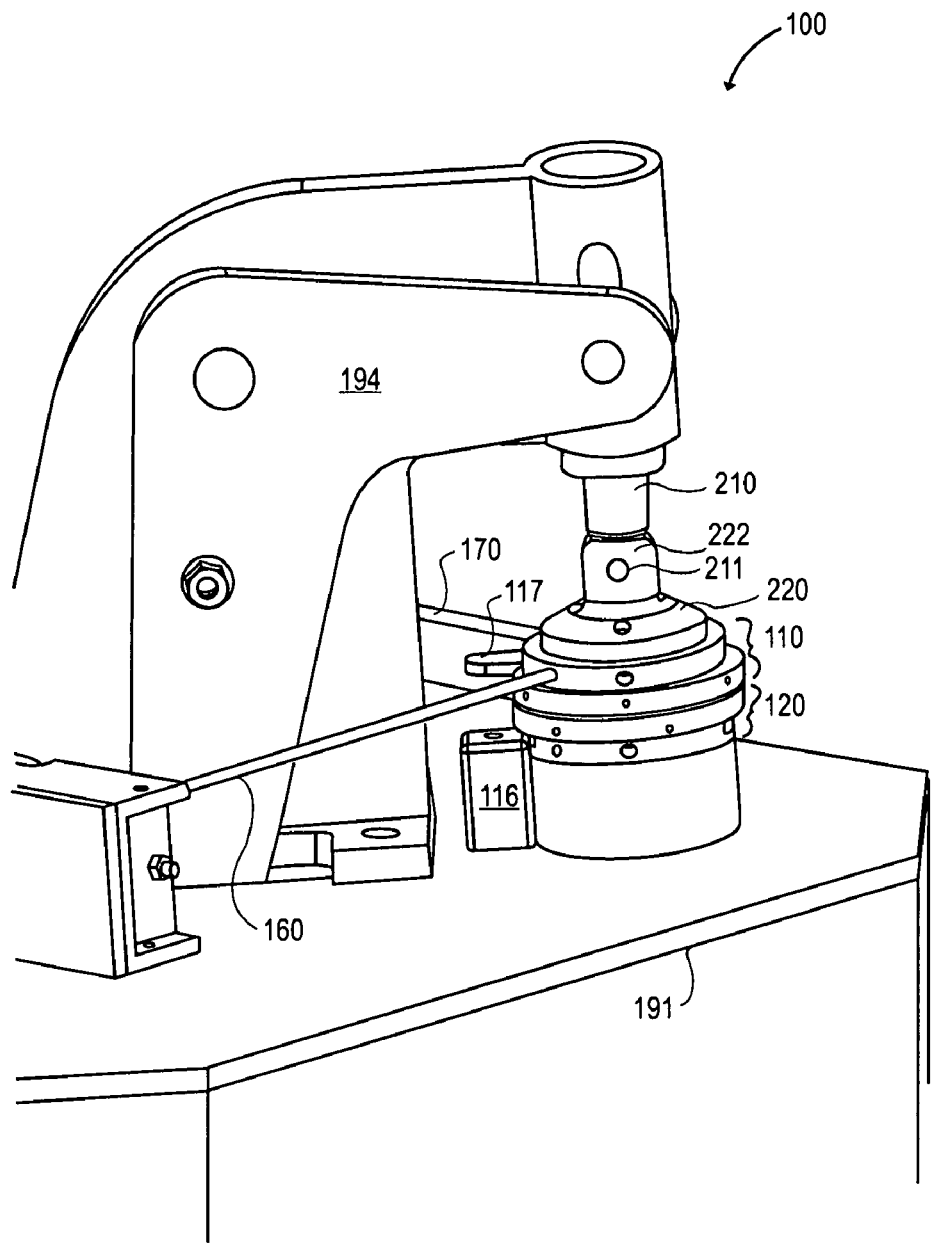
FIG. 4 illustrates a side perspective view of one embodiment of the press shown in FIG. 2.

FIG. 4 illustrates a side perspective view of one embodiment of the press shown in FIG. 2. In one embodiment, the position of the upper die 110 (and the corresponding amount of alignment required) may be determined by a sensor 116 fixedly mounted to, for example, lower die 120 and/or table 191. A sensing element of sensor 116 is directed toward a target 117 coupled to the movable upper die 110. When a workpiece (not shown) is pressed (e.g., imprinted) by upper die 110 and/or lower die 120 and a resulting feature on the workpiece (e.g., imprinted pattern on an embossable layer of a substrate) determined to be offset by some amount (e.g., imprinted track offset from a center of the substrate and/or imprinted tracks on each side of the substrate are not co-axially aligned with each other), that amount of offset may be adjustment by a servo control system (e.g., a computer or operator controlling motors 162, 172 to move rods 160, 170). The sensor 116 may be used to confirm when the proper amount of motion of upper die 110 (through motion of rod 160 and/or rod 170) has been achieved to align the workpiece with the upper die 110. Such an inspection may be done on a real-time or sampling basis.

The alignment mechanism described above provides a way to change an upper die position in real-time, without the use of, for example, air bearing supported lower die-sets of previously described conventional presses or without the need to stop the press during production. It should also be noted that the alignment mechanism described above is not limited to only alignment of an upper die but may also be used to align a lower die with, for example, a precision guided ram on the upper die. Alignment of a die may be performed, for example, while a workpiece is inserted and removed from between dies 110 and 120. A workpiece transport device (not shown) may be disposed next to or affixed to table 191 to transport a workpiece to and from dies 110, 120 such as a vacuum chuck coupled to a robotic arm that extends over table 191. Alternatively, other types of workpiece transport devices may be used.

Referring back to FIG. 2, the application of a force to upper die 110 along the Z-axis is generated by a sealed bladder 190 that may be disposed, for example, below table 191. Upon application of gas (e.g., air) pressure to the bladder 190, the bladder expands against a thrust plate 192. Thrust plate 192 presses a toggle link 193 that pushes bell crank 194. Bell crank 194, in turn, pushes against thrusting rod 210 and, in turn, pushes thrusting pad 220 down onto upper die 110. A high pressing force may be attained by such a configuration. In one embodiment, thrusting rod 210 may be pivotally coupled to thrusting pad 220 using a pin inserted through a collar portion 220 of thrusting pad 220 and a receiving pin portion 212 of thrusting rod 210, as illustrated in FIG. 5.

Figure 5:
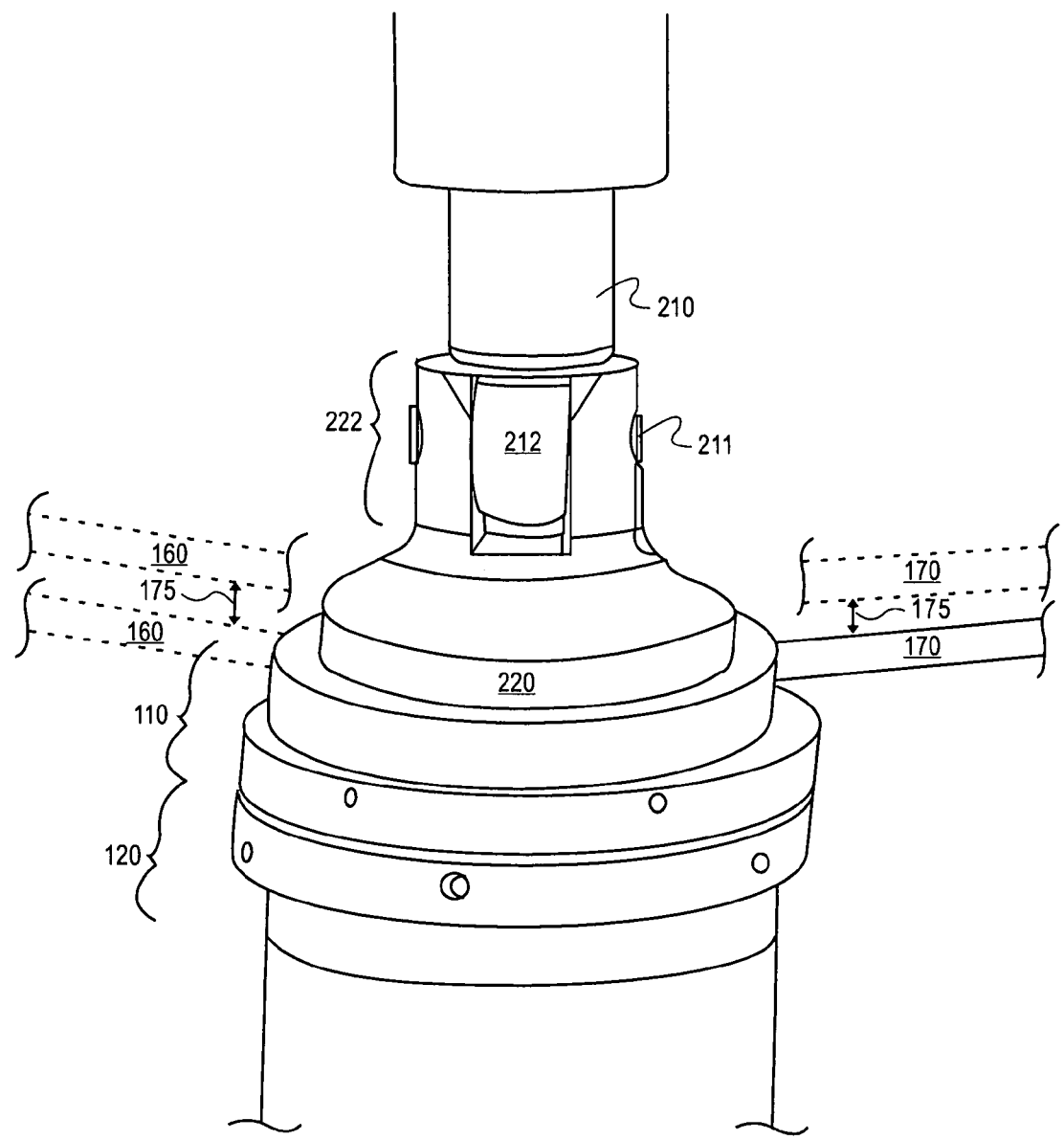
FIG. 5 illustrates one embodiment of the press in a closed, or down, position.

FIG. 5 illustrates the press 100 position where upper die 110 is pressed down on lower die 120 in a closed position. The dashed lines for rods 160 and 170 conceptually illustrate the position of the rods prior to the application of force to upper die 110 by thrust pad 220. When the press is open, the rods are flexed from their initial position (shown by the solid lines) a distance 175 to their flexed position (shown by the dashed lines). When the thrusting force is applied to upper die 110, upper die 110 moves down to a closed position and, thereby, flexure rods 170 and 160 return to their non-flexed position. It should be noted that the amount of flex 175 of rods 160 and 170, in particular, is not to scale and has been exaggerated in order to illustrate the operation of press 100.

Referring again to FIG. 2, when the pressure in bladder 190 is released, the bladder contracts and pulls on toggle link 193. Toggle link 193, in turn, pulls up thrusting rod 210 and, thereby, thrusting pad 220. As thrusting pad 220 raises, it in turn lifts upper die 110, as illustrated in FIG. 6.

Figure 6:
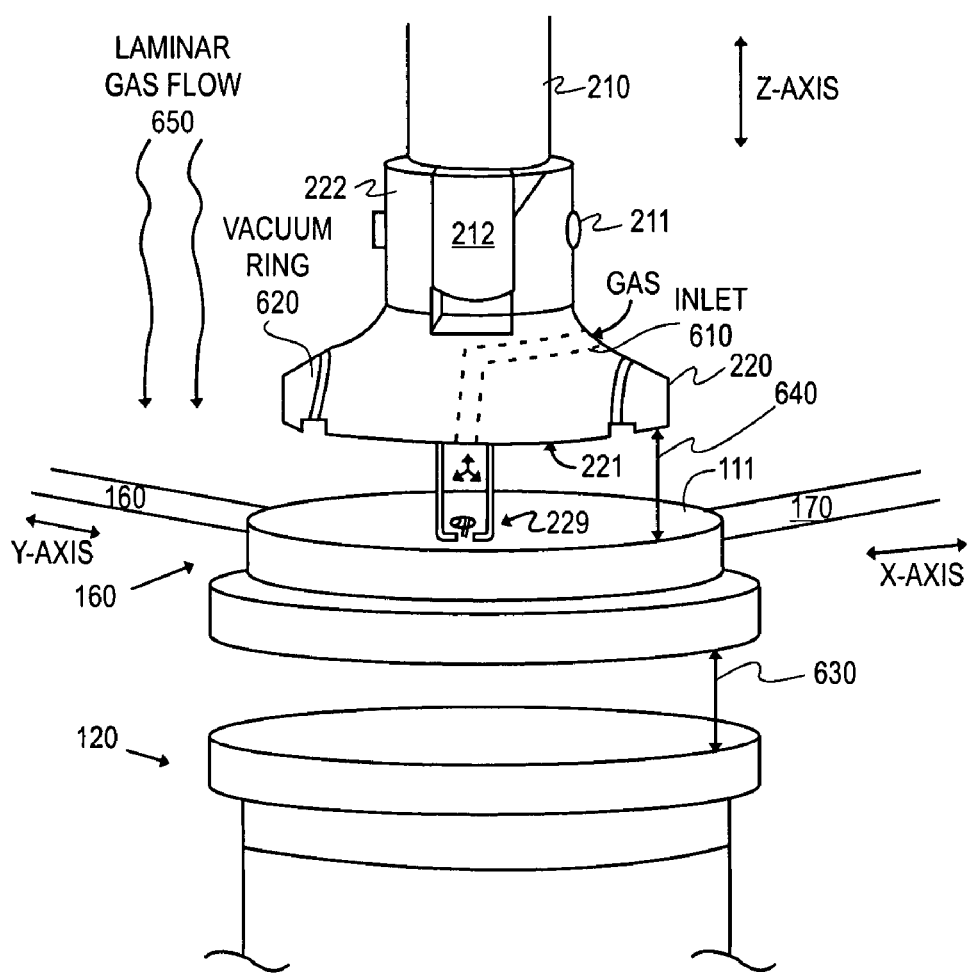
FIG. 6 illustrates one embodiment of the press in an open, or up, position.

FIG. 6 illustrates one embodiment of the press in an open position. In this embodiment, the thrust rod 210 is pivotally coupled to the thrust pad 220 as discussed above. In the open position, upper die 110 is raised off of lower die 120 a distance 630 to allow for insertion and removal of a workpiece. Thrust pad 220, while still being connected to upper die 110 via a floating linkage 229, has its surface raised off of upper die 110 a distance 640. In one embodiment, the thrust pad 220 contains a gas inlet 610. The gas inlet 610 is configured to direct gas (e.g., air) between a gas bearing surface of the thrust pad 220 and the upper die 110. In one embodiment, a pressurized gas (e.g., 100 psi) may be introduced through inlet 610 into the interface between the surface 221 of thrust pad 220 and the surface of 111 of upper die 110. If surface 221 of the thrust pad 220 is, for example, 10 square inches, then 1000 lbs of force can be generated on upper die 110 along the Z axis without imparting any substantial motion to upper die 110 along the X and Y axes during pressing. Depending on the force generated at the gas bearing interface, such lack of motion of upper die 110 along the X and Y axes may be due to a lack of mechanical contact between the thrust pad 220 and the upper die that could otherwise cause motion of the upper die. Alternatively, if substantially higher forces are used that results in contact between thrust pad 220 and upper die 110, such contact is limited to a time when the dies are closed in contact, and thrust pad 220 has no substantial translation along the X and Y axes that may generate a corresponding translation to upper die 110 upon contact. The pressures, dimensions, and forces provided above are only exemplary to illustrate the operation of the press and may have other values. In one embodiment, thrust pad 220 may include a vacuum ring 620 to remove any particulates at the gas bearing interface and/or to reduce disturbance of laminar flow 650.

Figure 7:
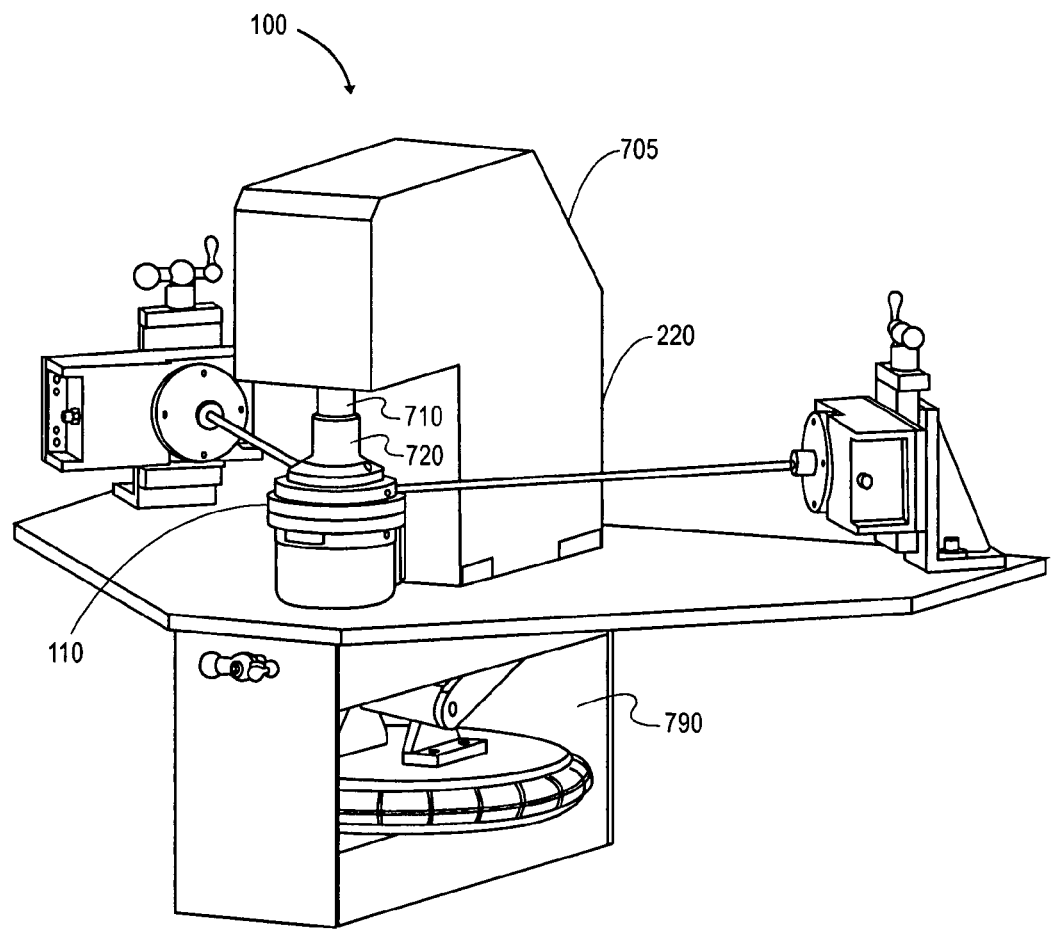
FIG. 7 illustrates one embodiment of the press having a shroud.

FIG. 7 illustrates one embodiment of the press having a shroud. In this embodiment, press 100 may include a shroud 705 which has a labyrinth seal 710, 720 to contain any particulates generated from the interface of thrust pad 220 and the upper die 110. The enshrouded press 100 frame may be evacuated such that particulates are drawn away from dies 110, 120 and into the base 790 where the particulates may be further removed by means known in the art.

Press 100 enables easier access to the die space than exists with multiple post die sets. Such easier access is further facilitated by the location of many of the press mechanisms behind dies 110, 120. In addition, no lubrication between the flexure rod(s) and the dies is required because there are no moving parts between them, only the flexure action of the rod(s). Press 100 may also be produced at very low manufacturing cost because no ultra-precisions parts may be required. Moreover, in one embodiment, press 100 may not contain any seals that could leak in the press during operation.

Figure 8:
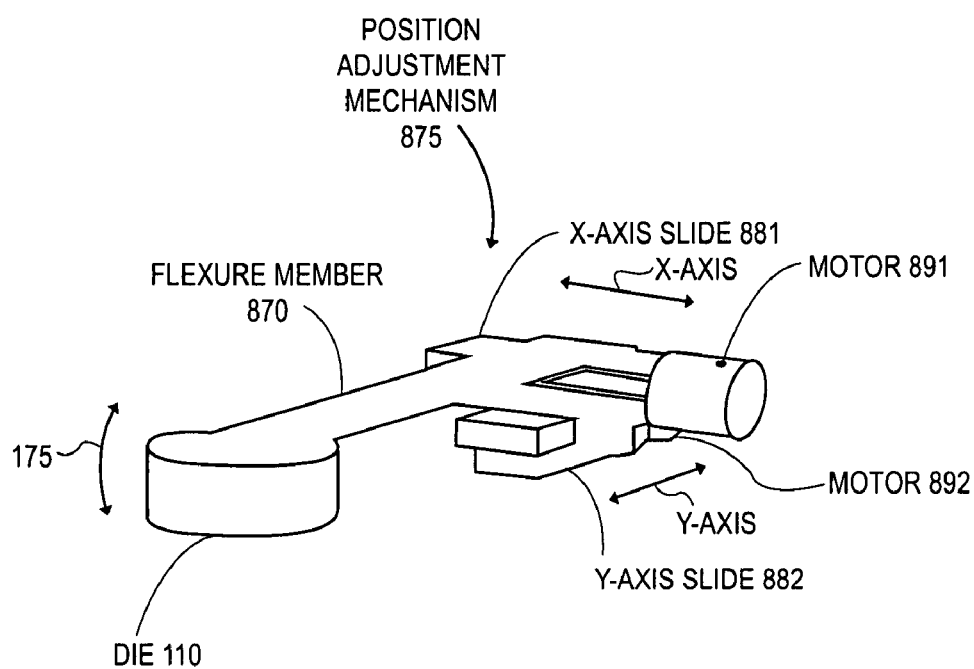
FIG. 8 illustrates one embodiment of a single flexure position adjustment mechanism.

FIG. 8 illustrates one embodiment of a single flexure position adjustment mechanism. In this embodiment, a single flexure member 870 may be used to adjust the position of a die (e.g., upper die 110) and provide for alignment of the die along both the X and Y axes. In this particular embodiment, the single flexure member 870 has the approximate prismatic shape of a blade. Alternatively, a flexure member having other shapes may be used, for example, rod shaped. Flex member 870 is constructed from a material and has dimensions (e.g., thickness and length) that allows for the member to flex 175 when die 110 is raised from a closed position to an open position, as discussed above, yet the width of the flex member is such that X-Y planer motion is substantially eliminated. In an exemplary embodiment, flexure member 870 may have a length in approximately the range of 20-36 inches and a thickness in approximately the range of 0.03 to 0.5 inches and a width in approximately the range of 0.12 to 5 inches. Such dimensions are only exemplary and flexure member 870 may have other dimensions.

Flexure member 870 is coupled to a die (e.g., die 110) at one of its ends. Flexure member 870 is coupled to a position adjustment mechanism 875 at its other end. In one embodiment, position adjustment mechanism 875 includes an x-axis slide 881 that is coupled to a motor 891 and a y-axis slide 882 coupled to motor 892. Motors 891 and 892 may be, for example, closed loop servo motors. Alternatively, other types of motors, as discussed previously, may be used. In an alternative embodiment, a common motor may be coupled to both of x-axis slide 881 and y-axis slide 882.

Figure 9:
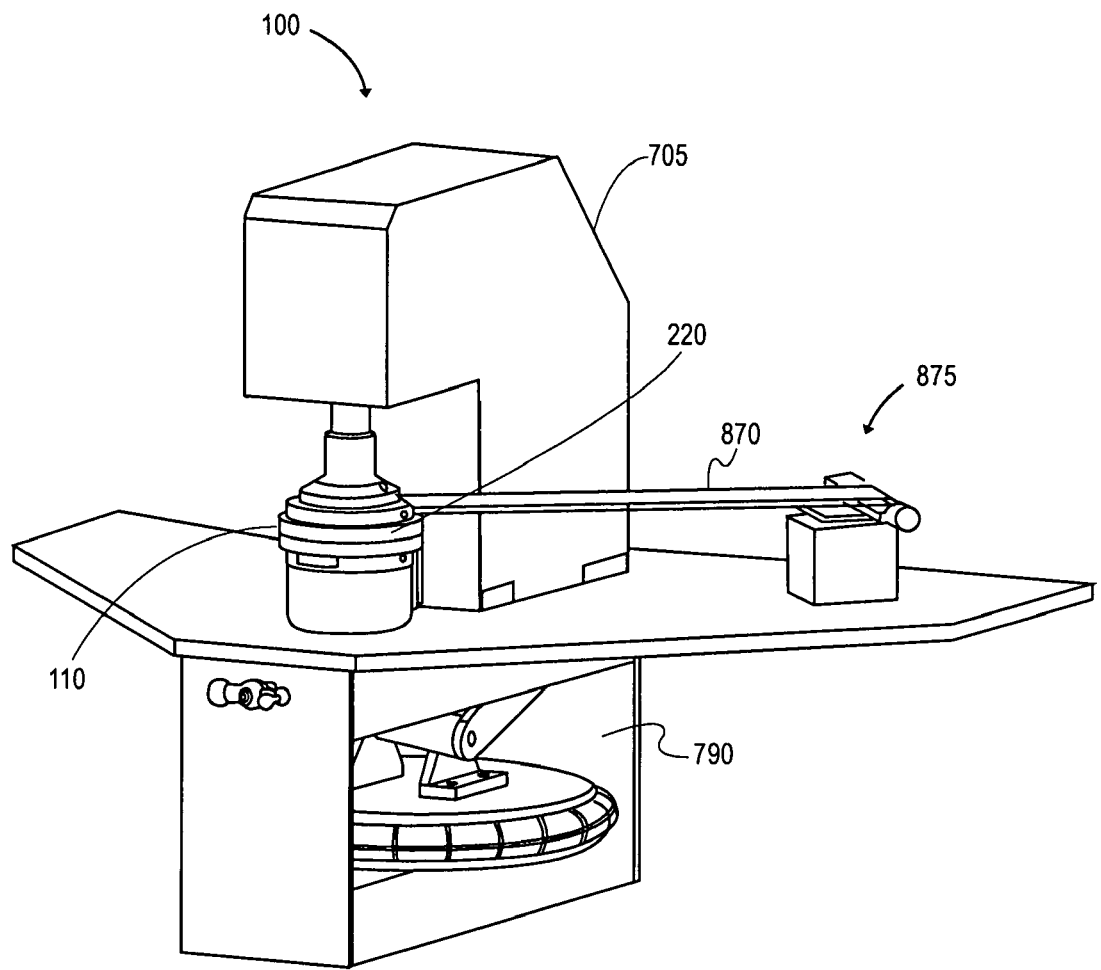
FIG. 9 illustrates an alternative embodiment of a press having the single flexure position adjustment of FIG. 8.

FIG. 9 illustrates one embodiment of press 100 with the single flexure position adjustment mechanism of FIG. 8. The operation of the components of press 100 of FIG. 9 is similar to that previously discussed above.

In the foregoing specification, the invention has been described with reference to specific exemplary embodiments thereof. It will, however, be evident that various modifications and changes may be made thereto without departing from the broader spirit and scope of the invention as set forth in the appended claims. For example, although certain figures and methods herein are discussed with respect to single-sided imprinting, they may be used for double-sided imprinting as well. The specification and figures are, accordingly, to be regarded in an illustrative rather than a restrictive sense.

What is claimed is:

1. A method of stamping a substrate, comprising:
   providing a die and a first flexure member;
   aligning the die by linearly displacing the die along a first axis using the first flexure member; and
   pressing the die along a second axis substantially perpendicular to the first axis while maintaining coupling of the die with the first flexure member.

2. The method of claim 1, further comprising aligning the die by linearly displacing the die along a third axis using a second flexure member.

3. The method of claim 2, wherein the first axis is substantially perpendicular to the second axis and the third axis.

4. The method of claim 3, further comprising:
   pressing the die in a direction perpendicular to the first and third axes while maintaining coupling of the die with the first and second flexure members.

5. The method of claim 4, wherein maintaining coupling comprises flexing the first and second flexure members during the pressing.

6. The method of claim 1, wherein aligning comprises linearly displacing the first flexure member using a first position adjustment mechanism.

7. The method of claim 6, further comprising detecting an offset in the position of the die using a target, coupled to the die, and a sensor.

8. The method of claim 7, wherein aligning comprises adjusting the position of the die using a servo control system.

9. The method of claim 6, wherein the first position adjustment mechanism comprises a spindle and wherein the first flexure member is a flexure rod, the flexure rod coupled to the spindle.

10. The method of claim 1, further comprising:
    raising the die; and
    maintaining coupling between the die and the first flexure member during the raising.

11. The method of claim 10, wherein the die is raised using a floating linkage coupled between the die and a thrust pad.

12. The method of claim 9, wherein the first flexure rod has a thread and the spindle has a thread receiver, and wherein the first flexure rod is coupled to the spindle using the thread and thread receiver.

13. The method of claim 1, further comprising:
    aligning the die along a third axis using the first flexure member; and
    pressing the die along the second axis substantially perpendicular to the first and third axes while maintaining coupling of the die with the first flexure member.

14. The method of claim 13, wherein maintaining coupling comprises flexing the first flexure member during the pressing.

15. The method of claim 14, further comprising:
    raising the die; and
    maintaining coupling between the die and the first flexure member during the raising.

16. The method of claim 12, wherein the first position adjustment mechanism further comprises a motor coupled to the spindle to rotate the spindle.

17. The method of claim 16, wherein the motor comprises a worm reduction gear.

18. The method of claim 1, further comprising: providing a thrust pad coupled to the first die through a gas bearing during an initial range of travel of the thrust pad.

19. The method of claim 18, further comprising: providing a thrust rod pivotally coupled to the thrust pad, the thrust pad comprising a gas inlet and a vacuum ring outlet.

20. The method of claim 19, wherein the gas inlet is configured to direct gas between a gas bearing surface of the thrust pad and the first die.

21. The method of claim 2, wherein aligning comprises linearly displacing the second flexure member using a second position adjustment mechanism.

22. The method of claim 21, wherein the second position adjustment mechanism comprises a second spindle and wherein the second flexure member is a second flexure rod, the second flexure rod coupled to the second spindle.

* * * * *